United States Patent
Balakrishnan et al.

(10) Patent No.: US 8,826,049 B2
(45) Date of Patent: Sep. 2, 2014

(54) MINIMIZING AIRFLOW USING PREFERENTIAL MEMORY ALLOCATION BY PRIORITIZING MEMORY WORKLOAD ALLOCATION TO MEMORY BANKS ACCORDING TO THE LOCATIONS OF MEMORY BANKS WITHIN THE ENCLOSURE

(75) Inventors: Ganesh Balakrishnan, Apex, NC (US); Bejoy J. Kochuparambil, Apex, NC (US); Matthew L. Nickerson, Raleigh, NC (US); Aparna Vallury, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 12/947,099

(22) Filed: Nov. 16, 2010

(65) Prior Publication Data

US 2012/0124590 A1     May 17, 2012

(51) Int. Cl.
*G06F 1/32*     (2006.01)
*G06F 9/46*     (2006.01)

(52) U.S. Cl.
USPC ............................................. 713/320; 713/1

(58) Field of Classification Search
CPC ....................................................... G06F 1/32
USPC ................................................... 713/1, 320
See application file for complete search history.

(56) References Cited

U.S. PATENT DOCUMENTS

| | | | |
|---|---|---|---|
| 7,222,216 B2 | 5/2007 | Guha et al. | |
| 7,500,078 B2 | 3/2009 | Rangarajan et al. | |
| 7,716,006 B2 | 5/2010 | Coskun et al. | |
| 7,784,050 B2 | 8/2010 | Harris | |
| 8,050,029 B1 * | 11/2011 | Kam et al. | 361/679.49 |
| 2005/0278520 A1 * | 12/2005 | Hirai et al. | 713/1 |
| 2006/0095911 A1 | 5/2006 | Uemura et al. | |
| 2006/0179334 A1 * | 8/2006 | Brittain et al. | 713/320 |
| 2007/0143763 A1 | 6/2007 | Adachi et al. | |
| 2009/0052268 A1 * | 2/2009 | Janzen et al. | 365/230.02 |
| 2009/0083506 A1 | 3/2009 | Reed et al. | |
| 2010/0037073 A1 * | 2/2010 | Huizenga et al. | 713/320 |
| 2010/0217454 A1 * | 8/2010 | Spiers et al. | 700/300 |
| 2011/0035078 A1 * | 2/2011 | Jackson | 700/300 |

OTHER PUBLICATIONS

Matthew E. Tolentino, "Managing Memory for Power, Performance, and Thermal Efficiency", Feb. 18, 2009, 180 pages.

* cited by examiner

*Primary Examiner* — Thomas Lee
*Assistant Examiner* — Terrell Johnson
(74) *Attorney, Agent, or Firm* — Katherine S. Brown; Jeffrey L. Streets

(57) ABSTRACT

One embodiment provides a method of controlling memory in a computer system. Airflow is generated through an enclosure at a variable airflow rate to cool a plurality of memory banks at different locations within the enclosure. The airflow rate is controlled as a function of the temperature of one or more of the memory banks. Memory workload is selectively allocated to the memory banks according to expected differences in airflow, such as differences in airflow temperature, at each of the different locations.

18 Claims, 5 Drawing Sheets

MINIMIZING AIRFLOW USING PREFERENTIAL MEMORY ALLOCATION BY PRIORITIZING MEMORY WORKLOAD ALLOCATION TO MEMORY BANKS ACCORDING TO THE LOCATIONS OF MEMORY BANKS WITHIN THE ENCLOSURE

BACKGROUND

1. Field of the Invention

The present invention relates to a computer system memory, including the allocation of memory workload to computer system memory.

2. Background of the Related Art

In a computer system, software instructions to be executed by a processor (CPU) are loaded from long-term storage, such as a hard disk drive (HDD), into random-access memory (RAM). RAM is typically provided by one or more memory modules, such as a DIMM (dual in-line memory module). A DIMM commonly includes a plurality of DRAM chips mounted on a thin printed circuit board. A DIMM consumes electrical power and generates heat in relation to the amount of power used. Therefore, the DIMM must be cooled in order to avoid thermal damage to the DIMM. A computer system is cooled by generating airflow through the system using fans or blowers. Some of that airflow is directed across the DIMMs for cooling the DIMMs.

Improving the energy efficiency of computer systems is an ongoing challenge. Historically, processors are responsible for consuming a large fraction of the total power consumed by a computer system. Therefore, much of the focus on improving the energy efficiency of a computer system has been on reducing the power consumption of processors. However, system memory density and capacity continue to increase to meet the performance needs of increasingly data-intensive software applications. As a result, the amount of energy consumed by memory has also increased.

BRIEF SUMMARY

One embodiment of the present invention provides a method of controlling memory in a computer system. Airflow is generated through an enclosure at a variable airflow rate to cool a plurality of memory banks. The memory banks are at different locations within the enclosure. The airflow rate is controlled as a function of the temperature of one or more of the memory banks. Memory workload is selectively allocated to the memory banks according to expected differences in airflow at each of the different locations. By preferentially allocating workload to memory banks expected to receive cooler airflow and/or a greater volume of airflow, the rate of airflow and associated cooling cost may be significantly reduced.

Another embodiment of the invention provides a computer system that includes an enclosure and a plurality of electronic components at different locations within the enclosure. The heat-generating electronic components may be, for example, memory banks or processors utilizing the memory banks. A cooling system is configured for generating airflow through the enclosure to cool the memory banks electronic components and controlling an airflow rate through the enclosure in relation to the temperatures of the heat-generating electronic components. A control system is configured for allocating workload to the heat-generating electronic components, such as processor-workload to processors or memory-workload to memory banks, according to a predefined prioritization based on the different locations of the heat-generating electronic components.

DETAILED DESCRIPTION

Embodiments of the invention include a system and method for selectively allocating workload to heat-generating components of a computer system in a manner that minimizes the airflow required to cool the computer system. In one embodiment, workload is selectively allocated to different components according to expected differences in airflow at the different components. Specifically disclosed are embodiments wherein memory workload is selectively allocated to memory banks, and processor load is correspondingly allocated to processors utilizing those memory banks. The allocation of workload may be prioritized according to expected differences in temperature, as well as expected differences in airflow rate, at each of the different locations of the processors and memory banks. For any two memory banks, workload may be preferentially allocated to the one of the memory banks expected to receive cooler airflow based on its location. The workload may be preferentially allocated to the memory bank expected to receive the cooler airflow, such as by running a greater volume of workload on that memory bank or by running more memory-intensive processes on the processor primarily utilizing that memory bank.

The prioritization of workload to heat-generating electronic components may be empirically determined and encoded in an electronic table at the design stage based on the physical layout of the computer system and the relative positioning of the heat-generating electronic components within an enclosure of the computer system. The table may, for example, be provided to an operating system upon booting or rebooting the computer system. The table may be subsequently updated according to detected or user-inputted physical changes to the configuration. The initial prioritization and subsequently updated prioritization may both be determined automatically by the computer system according to an electronic analysis of expected airflow patterns and associated heating of airflow based on physical layout of the computer system.

Preferentially allocating workload to components receiving cooler airflow reduces energy consumption by minimizing the airflow rate required to cool a system. Also, a cooler component will have lower electrical resistance losses and consume less energy for the same workload than a similar component at a higher temperature. Significantly, although memory temperatures (e.g. DIMM temperatures) may be sensed, the preferential allocation of workload may be determined independently of measuring actual memory temperatures. As a result, the airflow required to cool the computer system and the associated cost of cooling the system may be significantly reduced.

Figure 1:
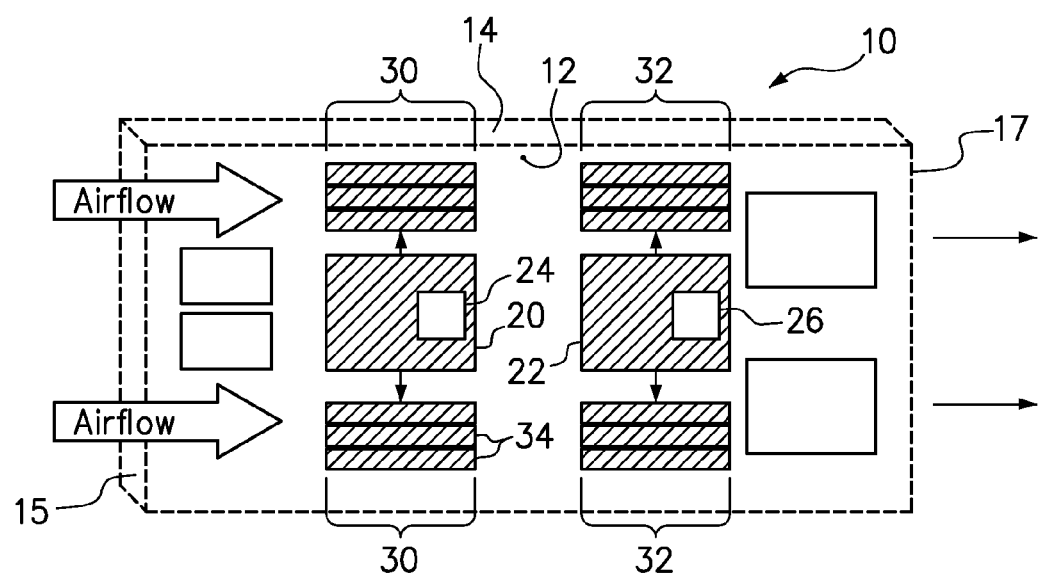
FIG. 1 is a perspective view of a server in which workload is selectively allocated to heat-generating components according to expected differences in airflow at the different locations of the heat-generating components.

FIG. 1 is a perspective view of a server 10 in which workload is selectively allocated to heat-generating components according to expected differences in airflow at the different locations of the heat-generating components. In one application, the server 10 may be a blade server, which may be combined with other servers and hardware to form a rack-mounted computer system having a desired power and performance. The server 10 includes a system board 12 (alternatively referred to as a main board or motherboard) having a variety of electronic components. The system board 12 and its components are housed within an enclosure 14 (shown in dashed/hidden lines). The heat-generating electronic components include first and second processors 20, 22 and respective first and second memory banks 30, 32 on the system board 12. The workload to the processors 20, 22 may be referred to as processor workload and the workload to the memory banks 30, 32 may be referred to as memory workload. Processor workload may be allocated to the processors 20 by selectively scheduling processes on the processors 20. In executing the scheduled processes, the processors 20, 22 generate memory workload to the respective memory banks 30, 32. The heat-generating components generate an amount of heat in relation to the workload and that heat must be removed to maintain safe operating temperatures of the components. To cool the components of the server 10, airflow is generated through the enclosure 14 in the direction indicated by the arrows, from an upstream/inlet end 15 to a downstream/outlet end 17. The airflow through the enclosure 14 may be generated, for example, by on-board cooling fans within the enclosure 14, by a rack-mounted chassis blower module (not shown) external to the enclosure 14, or a combination thereof.

In this example, each memory bank 30, 32 includes a total of twelve DIMMs 34, with three of those DIMMs 34 on either side of the respective processor 20, 22. Each processor 20, 22 includes an integrated memory controller (MC) 24, 26, although a memory controller and processor may alternatively be separate components of the system board 12. The two memory banks 30, 32 may be identical and use the same type of DIMM 34, such as DDR3. The two processors 20, 22 may also be identical, and include identical memory controllers 24, 26. Each processor 20, 22 is generally associated with the nearest memory bank 30, 32. Thus, the first processor (i.e. "upstream processor") 20 is uniquely associated with the upstream memory bank 30, and reads and writes primarily to the upstream memory bank 30 using the included memory controller 24, and the second processor 22 is uniquely associated with the second memory bank and reads and writes primarily to the second memory bank 32 using the included memory controller 26. When a software application, process, or other instruction set runs on one of the two available processors 20, 22, the relevant processor will typically utilize the included memory controller 24 or 26, respectively, to read and write to the associated memory bank 30, 32. For example, an application running on the upstream processor 20 will typically rely on the upstream memory bank 30 for operations requiring the use of RAM, while an application running on the second processor 22 will typically rely on the second memory bank 32.

Differences in airflow at each of the memory banks 30, 32 are expected to exist according to the locations of the memory banks 30, 32 and these expected differences may be predetermined. One expected difference in airflow is a difference in airflow temperature at the different locations of the memory banks 30, 32. An aspect of electronic component location that may cause different electronic components to receive airflow of different airflow temperatures is that the airflow may be progressively heated as it passes across heat-generating components. Generally, downstream airflow temperatures may be expected to be higher than upstream airflow temperatures. In the server configuration of FIG. 1, for example, the second processor 22 and the second memory bank 32 are directly downstream of the upstream processor 20 and upstream memory bank 30, resulting in a higher expected airflow temperature at the second processor 22 and second memory bank 32 than at the upstream processor 20 and upstream memory bank 30, respectively.

A related aspect of the memory bank location in a computer system that may affect the temperature of airflow at each of the memory banks is the specific physical shape of the enclosure and the layout of the various electronic components within the enclosure. The shape of the enclosure may cause expected differences in airflow patterns. Some electronic components receive airflow at a greater flow rate than others, as a direct result of the different locations of the electronic components. For a given airflow temperature, a component in an air-starved location, for example, may be expected to run hotter than an identical component in a location receiving a greater airflow rate. Also, airstreams that travel in proximity to hotter components or a greater number of components may also absorb more heat. In the specific example configuration of the server 10, the airflow is expected to be linear and a cross-section of the airflow from the inlet end 15 to the outlet end 17 is expected to be somewhat uniform. However, in other server configurations, the shape of the enclosure or the positioning of the memory banks may be more complex, leading to more intricate flow patterns. The basic airflow pattern through a particular server may be empirically determined, such as at a design stage, and updated throughout the lifecycle of a particular unit.

Continuing with the present example of FIG. 1, the two memory banks 30, 32 are functionally identical and the two processors 20, 22 are functionally identical. Therefore, a given application or process should achieve about the same performance and be executed at about the same rate, regardless of whether the given application or process is run on the upstream processor 20 and associated upstream memory bank 30 or on the second processor 22 and associated second memory bank 32. The upstream processor 20, as well as the downstream processor 22, will typically have been heated as a result of having previously run some applications or processes. Other, concurrently-run applications or processes that haven't been apportioned (e.g. operating system processes run on the processors 20, 22) may also contribute to the heating of the processors 20, 22 and memory banks 30, 32. However, the first processor 20 receives relatively cool air from the inlet 15, whereas the second processor 22 and memory bank 32 are downstream from the upstream processor 20 and memory bank 30 are receive air that has been heated by the upstream processor 20 and memory bank 30. Thus, the airflow will typically be hotter at the second processor 22 and memory bank 32, even with similar workloads.

Figure 2:
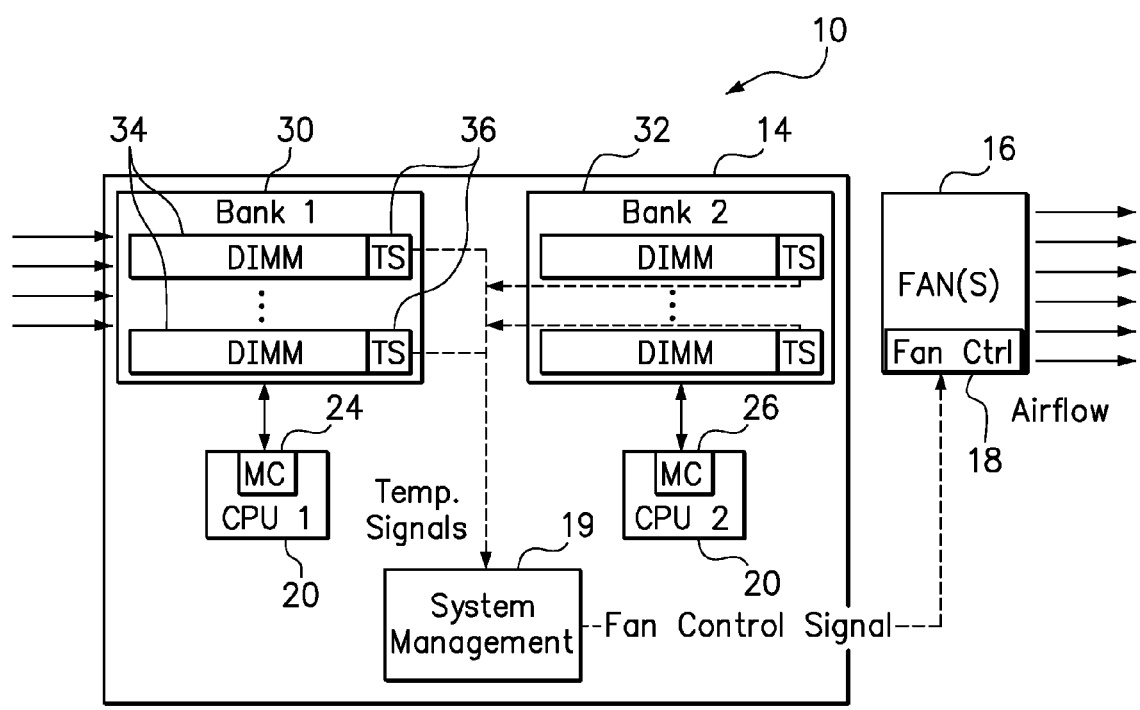
FIG. 2 is a schematic diagram of the server illustrating airflow control through the enclosure.

FIG. 2 is a schematic diagram of the server 10 illustrating airflow control through the enclosure 14. System management 19 provides various control functionality independently of an operating system. System management 19 may comprise a baseboard management controller (BMC) or integrated management module (IMM). Alternatively, system management 19 may comprise an advanced management module of a BLADECENTER server system (BLADECENTER is a trademark of IBM Corporation in Armonk, N.Y.). A thermal sensor 36 is provided with each DIMM 34 to sense the temperature of the respective DIMM 34. For example, current DDR3 DIMMs have built-in thermal sensors that system management 19 uses to control the speed of fans according to temperature. Each thermal sensor 36 is responsive to the temperature of the DIMM 36 with which it is included or otherwise engaged, which is not necessarily at the same temperature as the airflow over that DIMM 36. A fan controller 18 may be included with the fans 16 so that the fans 16 adjust their own speed according to the temperatures of the DIMMs 34, such as the highest temperature of any of the DIMMs. Alternatively, the fan speed may be controlled by a separate controller provided on the system board 14.

The fan controller 18 and system management 19 cooperate to control the airflow rate through the enclosure 14 in relation to the temperatures of the DIMMs 34. A variety of fan control algorithms may be employed to control the fan speed according to the temperatures of the DIMMs 34 as reported by the thermal sensors 36. In a simple, non-limiting example, the fan speed in the server 10 may be regulated according to the highest temperature reported by the thermal sensors 36. For example, if the highest temperature reported by any of the thermal sensors 36 comes from one of the DIMMs 34 in the second memory bank 32, then a fan speed and corresponding airflow rate may be selected to provide sufficient cooling for the DIMM(s) 34 at that highest reported temperature, even if that airflow rate is more than sufficient for cooling the DIMMs 34 in the upstream memory bank 30. Due to the hotter airflow at the second processor 22 and memory bank 32, running an application on the second processor 22 may therefore cause the respective second memory bank 32 to run hotter than if the same application were run on the upstream processor 20, which primarily utilizes the upstream memory bank 30. The fans may run at a faster rate as a result of the higher temperature of the downstream memory bank 32, resulting in a greater system power consumption than if the application were run on the upstream processor 20 and associated memory bank 30.

In accordance with embodiments of the present invention, workload is selectively allocated to the heat-generating components according to the expected differences in airflow at the different locations of the heat-generating components. In particular, processor workload may be preferentially allocated to the upstream processor 20, and memory workload may be preferentially allocated to the first memory bank (i.e. "upstream memory bank") 30. Because the upstream processor 20 and upstream memory bank 30 are expected to receive cooler airflow than the downstream second processor 22 and second memory bank 32, these upstream components are expected to run cooler for a given amount of workload. The cooler-running upstream components may therefore be cooled at lower airflow rates, and as discussed with reference to FIG. 2, this results in lower power consumption via lower fan speeds. Therefore, prioritizing the workload to these upstream components according to expected lower DIMM temperatures results in greater efficiency and power savings, particularly when the current workload may be performed entirely or largely on the upstream processor 20 and associated memory bank 30.

Figure 3:
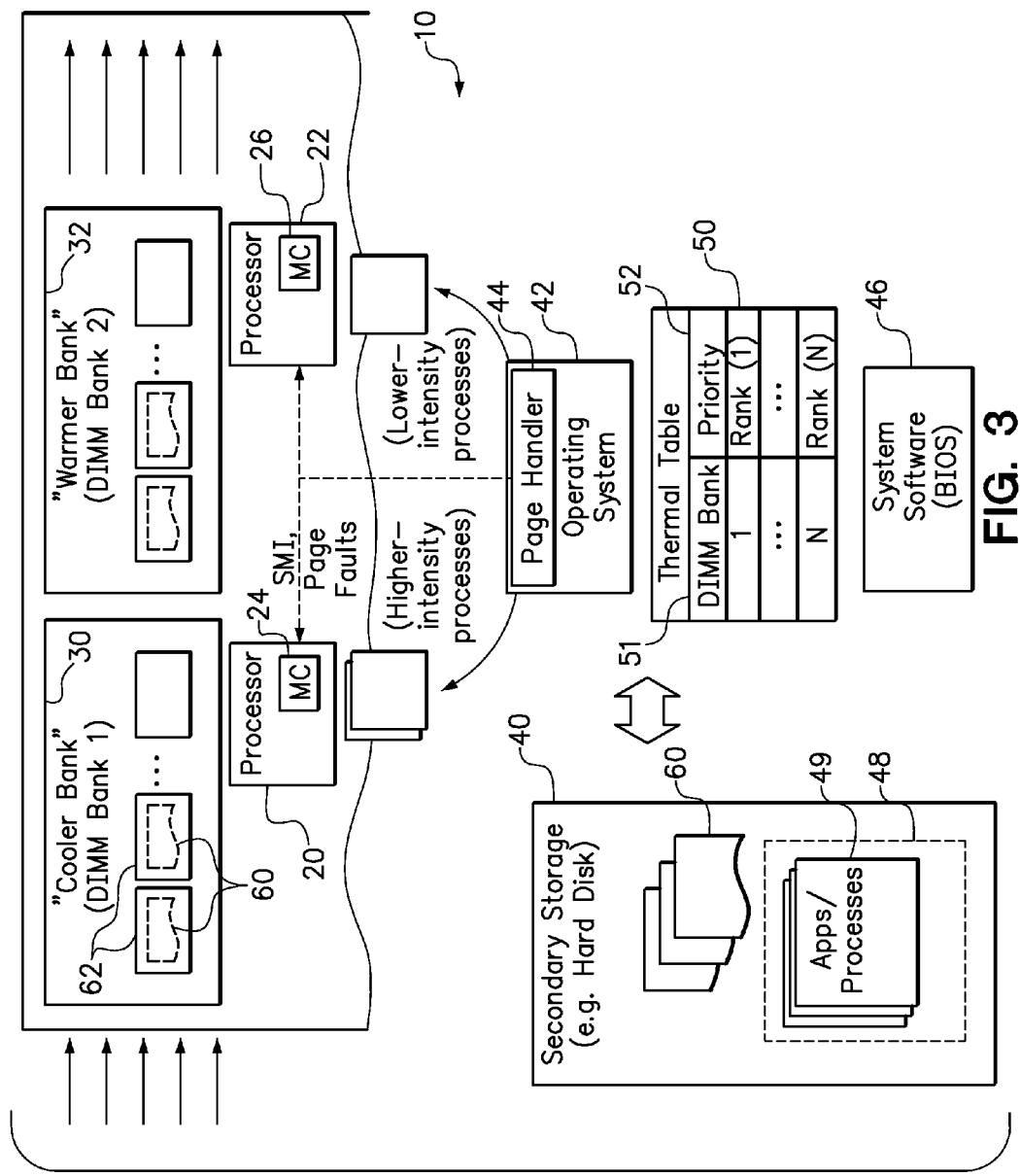
FIG. 3 is a schematic diagram of the server illustrating an example of workload being preferentially allocated to the upstream processor and memory bank 30, which are expected receive cooler airflow.

FIG. 3 is a schematic diagram of the server 10 illustrating an example of workload being preferentially allocated to the upstream processor 20 and memory bank 30. A hard disk drive (HDD) 40 provides long-term storage for software 48, which includes an operating system (OS) 42 and application software 49. The HDD 40 retains the software even in a powered-off state. The OS 42 is software, consisting of programs and data, that runs on the server 10 to manage the computer hardware. The OS 42 provides common services for efficient execution of various application software. The OS 42 is started during a process referred to as "booting up" or simply "booting," which may be performed automatically when the server 10 is started or restarted. During booting, computer executable program code included with the OS 42 is loaded from the HDD 40 into RAM, which is provided in this embodiment by the DIMMs 34 (see FIG. 2) of the two memory banks 30, 32. The OS 42 acts as an interface between various application software and the hardware, such as the processors 20, 22 and DIMMs.

System software 46, which may include BIOS (Basic Input/Output System), EFI (Extensible Firmware Interface), or a variant thereof, provides a prioritization table 50 to the OS 42 at boot time. The electronically-stored table 50 is provided to the OS 42 for prioritizing workload to the memory banks 30, 32. The table 50 includes a "DIMM Bank" column 51 and a "Priority" column 52. The table 50 is generalized in the figure to any number "N" memory banks. The Priority column 52 indicates a relative priority by which memory is to be allocated to the corresponding memory bank identified in the DIMM Bank column 51. The initial determination of priority may be done statically during system design based on the physical layout of the server 10. In the present example, there are only two memory banks 30, 32, such that N=2. DIMM Bank 1 is the upstream memory bank 30, which may be referred to as the "cooler bank," and DIMM Bank 2 is the downstream memory bank 32, which may be referred to as the "warmer bank." Because DIMM Bank 1 is expected to receive cooler airflow, DIMM Bank 1 is given a higher priority than DIMM Bank 2 for the allocation of memory workload.

Memory workload is allocated to the memory banks according to their respective priority. A first example way in which memory may be allocated according to priority is to allocate memory to cooler memory banks whenever possible. That is, memory workload may be allocated to the upstream bank 30 up to the full capacity of the upstream bank 30, before allocating memory workload to the downstream bank 32, presumably only so long as the upstream memory bank remains cooler. Another example way in which memory may be allocated according to priority is to preferentially allocate a greater volume of memory workload to the upstream bank, but not necessarily to the full capacity of the upstream bank. However, memory workload may be more selectively allocated to the upstream bank because there is limited memory in the upstream bank, and only a finite number of processors may be attached to the cold bank. Therefore, a third way in which to preferentially allocate memory workload to the upstream bank is to allocate processes that are memory-intensive to the higher-priority bank and to allocate processes that are less memory-intensive to the lower-priority banks. In one embodiment, the user can designate processes as memory intensive and the OS 42 can allocate and prioritize scheduling of the process on the upstream processor, utilizing the upstream bank. Alternatively, an intensity threshold may be specified, wherein only workload at or above the intensity threshold may be prioritized to the upstream bank. In an under-utilized system, the OS 42 can greedily utilize the cold banks because there might be sufficient memory on the upstream bank and sufficient number of processor cores available on the processor 20 associated with the upstream bank.

In FIG. 3, the memory workload is allocated, at least in part, using a page handler 44 optionally provided with the OS 42. Paging, generally, refers to one of the memory-management schemes by which a computer can store and retrieve data from the secondary storage (HDD) 40. To perform paging, the OS 42 may retrieve data from secondary storage 40 in segments referred to as pages 60. Paging allows the physical address space of a process to be noncontiguous. Paging allows the OS 42 to use HDD storage for data that does not fit into RAM provided in the memory bank 30 or 32 to which a particular page 60 is to be stored. Paging may be implemented as architecture-specific code built into the kernel of the OS 42. The OS may generate a page handler 44 to allocate pages 60 to the upstream (cooler) bank 30, and to schedule processes 49 selected from software 48 on the respective processor 20 uniquely associated the cooler bank according to whatever prioritization method is chosen.

The OS 42 may generate a page fault, as needed, to allocate the memory to the memory banks 30, 32. A page fault is an interrupt (or exception) to the software raised by the hardware, when a process accesses a page 60 that is mapped in address space, but not loaded in physical memory. In the case of a page fault, the OS has the ability to map a page on to a frame 62. In one embodiment, the page fault handler may look up the table 50 and preferentially allocate frames 62 to the upstream bank 30. The OS 42 may also prioritize process scheduling on the processor 20 associated with the cooler bank 30, thereby taking advantage of memory allocated to the local MC 24.

The initial prioritization embodied in the table 50 may be empirically determined according to the particular computer system configuration, such as at the design stage. However, various physical changes to the configuration may occur over the lifespan of the computer system, affecting the airflow and the associated thermal characteristics of the computer system. For example, fans may fail or be removed, or fans may be changed out with fans having different specifications. As another example, components may be added or replaced within an enclosure, where the change in components affects the airflow through the enclosure. Some of these changes, such as a failed or missing fan, may be automatically detected, such as by system software 46. Other changes may be input manually to the computer system. Therefore, a physical change in the computer system affecting airflow through the enclosure may be detected or input. The prioritization may be updated in the table 50 to reflect the changed physical configuration. The updated prioritization may specify a new allocation of memory workload to the memory banks according to an expected change in airflow due to the detected physical change. In one example of updating the prioritization table 50, a service management interrupt (SMI) may be generated by the OS 42 to invoke a system management mode. After the table 50 is updated to reflect the changed physical configuration of the system, the SMI may be exited.

Figure 4:
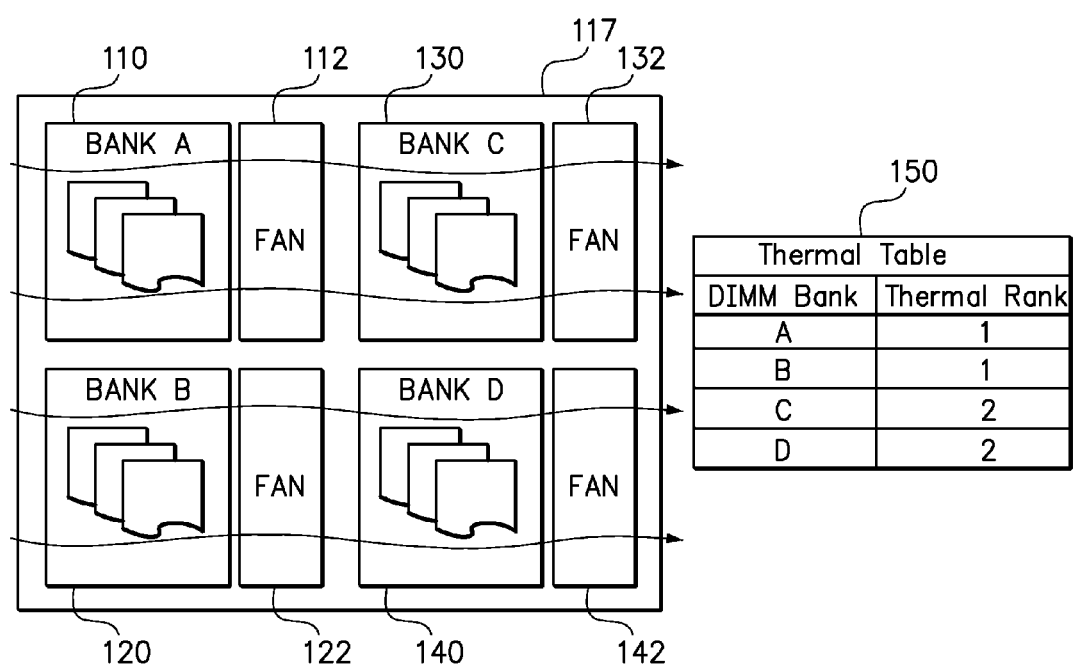
FIG. 4 is a schematic diagram of an example computer system configuration having four memory banks.
Figure 5:
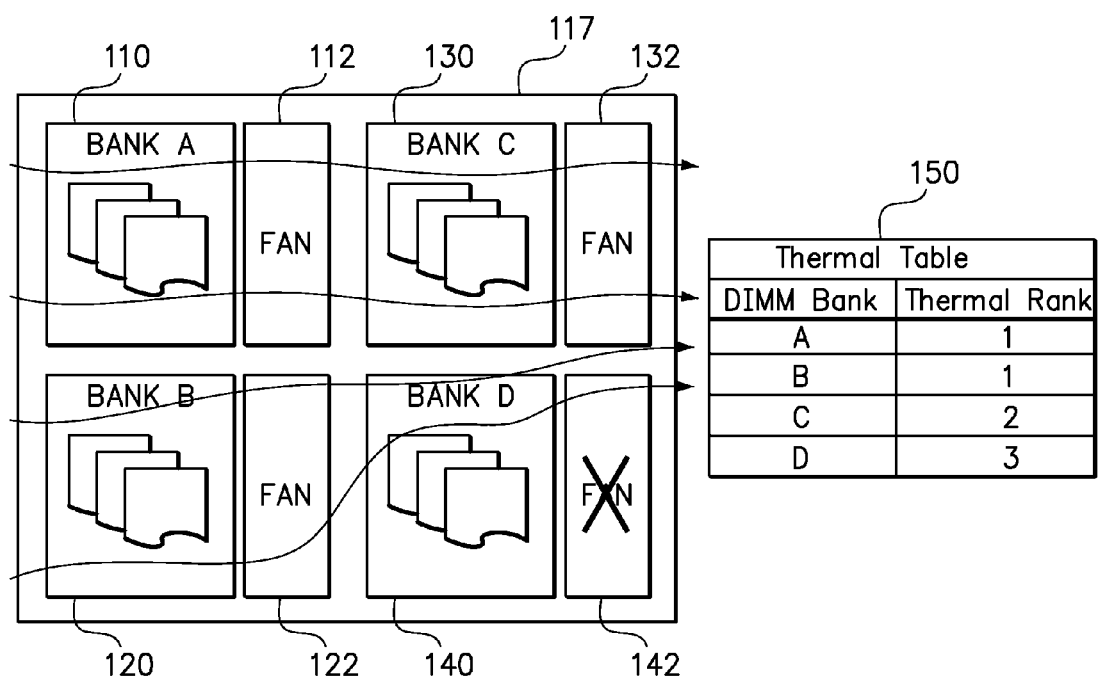
FIG. 5 is a schematic diagram of the computer system of FIG. 4, with one of the fans disabled, failed, or removed.

FIGS. 4 and 5 illustrate how workload may be re-prioritized according to physical changes in the computer system. FIG. 4 is a schematic diagram of a computer system 100 having an example configuration that includes four memory banks 110 ("Bank A"), 120 ("Bank B"), 130 ("Bank C"), and 140 ("Bank D"). Four fans 112, 122, 132, and 142 are provided within the enclosure 117, each directly downstream of one of the memory banks 110, 120, 130, 140. With reference to a direction of airflow indicated by the arrows, Banks A and B are both upstream and are expected to receive cooler airflow, while Banks C and D are both downstream and are expected to receive warmer airflow (relative to the airflow received by Banks A and B). Due to symmetry, the airflow received by Banks A and B are expected to be at about the same temperature, and the airflow received by Banks C and D are expected to be at about the same temperature. The described configuration is provided as a simplified example to facilitate discussion, and is not intended to represent any specific computer system configuration known in the art.

With all four fans 112, 122, 132, 142 operational, the airflow through the enclosure 117 is expected to be substantially uniform, as indicated by parallel airstreams 105. Therefore, upstream Banks A and B are assigned equal priority ("1"), and downstream Banks C and D are assigned equal priority ("2"). Thus, by whatever method workload is to be prioritized (e.g. by volume or intensity), the workload may be preferentially assigned to upstream Banks A and B equally, over downstream Banks C and D. In one example, memory workload may be distributed substantially equally to upstream Banks A and B first unless or until Banks A and B reach capacity, after which workload may then be assigned to downstream Banks C and D. In another example, memory workload having an intensity above a specified threshold intensity may be preferentially allocated to the upstream Banks A and B, and workload having an intensity below the specified threshold intensity may be allocated to the downstream Banks C and D.

FIG. 5 is a schematic diagram of the computer system 100 of FIG. 4, with one of the fans 142 disabled, failed, or removed. Without the fan 142 contributing to the generation of airflow, the airflow is skewed, as indicated by skewed airstreams 107. The table 150 may be updated so that, for example, Banks A and B still have the same priority ("1"), while Bank C has a lower priority ("2") than either Banks A or B, and Bank D has a lower priority ("3") than Bank C. Thus, memory workload may be preferentially allocated to Banks A and B equally, then to Bank C as a lower priority, and finally to Bank D as a lower priority still.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of controlling memory in a computer system, comprising:

generating airflow through an enclosure at a variable airflow rate to cool a plurality of memory banks at different locations within the enclosure;

controlling the airflow rate as a function of the temperature of one or more of the memory banks;

selectively allocating memory workload to the memory banks according to expected differences in airflow at each of the different locations;

and providing an electronic table to the operating system, the electronic table providing a prioritization by which to allocate the memory workload to the memory banks according to the locations of the memory banks within the enclosure;

wherein the prioritization provided by the electronic table specifies a range of higher to lower prioritization levels, by which a memory bank at a higher prioritization level is designated to receive a greater volume or intensity of workload than a memory bank at a lower prioritization level.

2. The method of claim 1, wherein the expected differences in airflow include expected temperature differences at the different locations of the memory banks.

3. The method of claim 1, further comprising:
determining which of any two memory banks in the computer system is expected to receive cooler airflow according to the locations of the two memory banks within the enclosure; and
preferentially allocating workload to the memory bank expected to receive the cooler airflow.

4. The method of claim 3, further comprising:
preferentially allocating a higher-bandwidth portion of memory workload to the memory bank expected to receive the cooler airflow.

5. The method of claim 3, further comprising:
preferentially allocating a greater volume of memory workload to the memory bank expected to receive the cooler airflow.

6. The method of claim 1, further comprising:
preferentially scheduling processes on processors primarily utilizing the memory bank expected to receive the cooler airflow.

7. The method of claim 1, further comprising:
detecting a physical change in the computer system affecting airflow through the enclosure; and
changing the allocation of memory workload to the memory banks according to an expected change in airflow due to the detected physical change in the computer system.

8. The method of claim 7, wherein the detected physical change includes the failure or removal of a fan, wherein at least one or more other fans continue to generate airflow through the enclosure.

9. The method of claim 1, further comprising:
statically determining the prioritization by which to allocate the memory workload based on a predefined configuration of the computer system specifying the locations of the memory banks.

10. The method of claim 1, further comprising:
booting an operating system of the computer system; and
providing the electronic table to the operating system while booting the operating system.

11. The method of claim 1, further comprising:
dynamically updating the electronic table in response to a physical change in the computer system affecting airflow through the enclosure.

12. The method of claim 3, wherein the airflow rate is controlled as a function of the highest temperature of any of the one or more memory banks.

13. A computer system, comprising:
an enclosure;
a plurality of heat-generating electronic components at different locations within the enclosure;
a cooling system configured for generating airflow through the enclosure to cool the heat generating electronic components and controlling an airflow rate through the enclosure in relation to the temperatures of the electronic components; and
a control system configured for allocating workload to the heat-generating electronic components according to a predefined prioritization based on the different locations of the heat generating electronic components;
an operating system; and
an electronic table accessible to the operating system, the electronic table providing a prioritization by which the operating system is configured to preferentially allocate the workload to the heat-generating electronic components according to the different locations of the heat-generating electronic components within the enclosure;
wherein the prioritization provided by the electronic table specifies a range of higher to lower prioritization levels, by which a memory bank at a higher prioritization level is designated to receive a greater volume or intensity of workload than a memory bank at a lower prioritization level.

14. The computer system of claim 13, wherein the electronic table designates at least one cool memory bank and one warm memory bank, wherein the cool memory bank is expected to normally receive cooler airflow than the warm memory bank based on the locations of the cool memory bank and warm memory bank, and the operating system is configured to preferentially allocate pages of memory to the cool memory bank over the warm memory bank.

15. The computer system of claim 14, wherein the operating system is configured to allocate memory-intensive processor workload to a processor utilizing the cool memory bank.

16. The computer system of claim 14, wherein the operating system is configured to allocate higher-bandwidth memory workload to the cool memory bank than to the warm memory bank.

17. A computer program product including computer usable program code embodied on a non-transitory computer usable storage medium, the computer program product comprising:
computer usable program code for controlling an airflow rate of airflow through an enclosure as a function of the temperature of one or more of the memory banks; and
computer usable program code for selectively allocating memory workload to the memory banks according to expected differences in airflow at each of the different locations;
computer usable program code embodying a table, the table providing a prioritization for an operating system to use to allocate the memory workload to the memory banks according to the locations of the memory banks within the enclosure;
wherein the prioritization provided by the electronic table specifies a range of higher to lower prioritization levels, by which a memory bank at a higher prioritization level is designated to receive a greater volume or intensity of workload than a memory bank at a lower prioritization level.

18. The computer program product of claim 17, wherein the airflow rate is controlled as a function of the highest temperature of any of the one or more memory banks.

* * * * *